Nov. 1, 1966    A. E. BROWN ETAL    3,283,044
METHOD OF FIRING CERAMICS
Filed Dec. 26, 1962
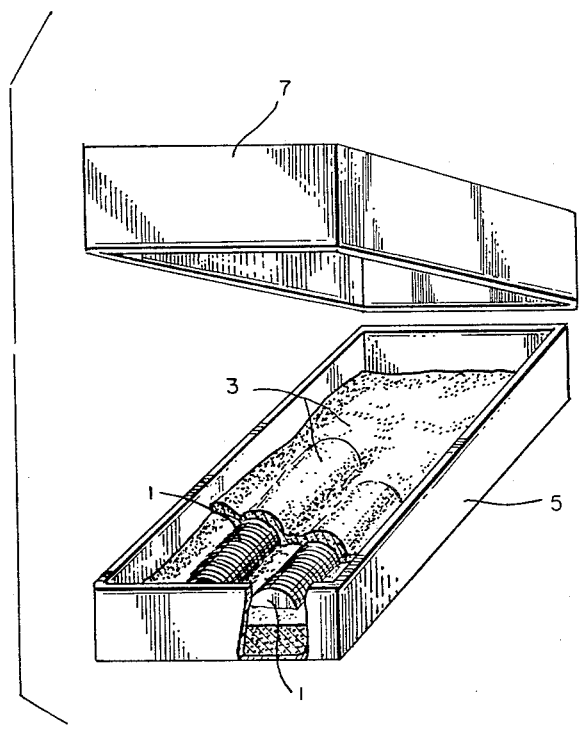
INVENTORS
ARTHUR E. BROWN
ROBERT J. FISCHER
BY
*Harry M. Saragovitz*
ATTORNEY.

3,283,044
METHOD OF FIRING CERAMICS

Arthur E. Brown, Red Bank, and Robert J. Fischer, West Long Branch, N.J., assignors to the United States of America as represented by the Secretary of the Army
Filed Dec. 26, 1962, Ser. No. 247,421
1 Claim. (Cl. 264—58)

The invention described herein may be manufactured and used by or for the Government for governmental purposes without the payment of any royalty thereon.

This invention relates to a method of firing ceramic materials in which as least one component is volatile at a temperature below the firing temperature of the ceramic material and particularly, to a method of firing lead zirconate-lead titanate ceramic.

An object of the invention is to fire ceramic materials in which at least one component is volatile at a temperature below the firing temperature of the ceramic material. A further object is to fire such ceramic materials so that a minimum of space is required. A still further object is to maintain a constant stoichiometry and density throughout the ceramic materials during the firing. Another object is to fire such ceramic materials so they will be suitable for use in devices such as ceramic filters, accelerometers, fuses, transducers, dielectric materials, etc.

It has been found that the foregoing objects can be attained by a method of firing which involves initially laying down a bed of sand in a sagger. The sand is composed of a crushed powder of the component of the ceramic material that is volatile at a temperature below the firing temperature of the ceramic material. The ceramic materials to be fired, preferably in disc form, are stacked and embedded in rows in the sand and then completely covered with the sand. A muffle cover is then placed on the sagger.

The above arrangement is illustrated in the drawing wherein 1 is the ceramic material in disc form stacked and embedded in rows in the sand 3, 5 is the sagger in which the ceramic material and sand is contained, and 7 is the muffle cover for the sagger. The entire assembly is placed into a kiln and fired according to the desired heat treatment. After firing, the ceramic discs are recovered by screening.

In the above method, the sand serves both as a support and a donor to the atmosphere of the ceramic materials inasmuch as the sand includes the volatile component of the ceramic material. The method is especially suited to the firing of lead zirconate-lead titanate ceramic material, although other ceramic materials such as cadmium niobate ceramics, zinc titanate-lead niobate-lead titanate-lead zirconate ceramics, etc., are amenable to the method.

The following example is illustrative of how the new method is applied in the firing of lead zirconate-lead titanate ceramic.

EXAMPLE 20 mesh lead zirconate placing sand is laid in a bed in an alumina sagger. The sand is obtained by crushing lead zirconate pellets through a 20 mesh screen. Then 200 discs of lead zirconate-lead titanate ceramic composed of 55 parts by weight of lead zirconate and 45 parts by weight of lead titanate are stacked and embedded in the sand in 4 rows, each row containing 50 discs. Each disc is $9/16$ inch diameter by $1/16$ inch in thickness and weighs about 1.4 grams. The alumina sagger is 1¼ inches high by 2¾ inches wide by 6 inches in length. Additional lead zirconate placing sand is added to cover the ceramic discs, the total weight of sand used being 200 grams. An alumina muffle cover is then placed over the sagger. The entire arrangement is then placed in a globar fired furnace and fired at 2260° F. for ¾ hour. After firing, the discs are recovered by screening. The loss of lead oxide in each disc is held to a minimum, and good reproducibility in the same batch and from batch to batch can be maintained. The lead zirconate placing sand can be used in repeated firings with unfired lead zirconate-lead titanate compositions.

The particular firing conditions employed will vary, the variation being dependent on the size, weight, volume, and composition of the mass to be fired. The particular conditions to be used however, are easily determinable by the ceramist.

The above method is also applicable to the fluorination of barium titanate ceramic if the "sand" contains fluorides and is refractory. In such as case, fluorinated barium titanate "sand" serves as the donor media.

It is intended that the foregoing description be considered only as illustrative and not in limitation of the invention as hereinafter claimed.

What is claimed is:

The method of firing lead zirconate-lead titanate ceramics comprising laying down a bed of sand sized lead zirconate in an alumina sagger, stacking and embedding lead zirconate-lead titanate ceramic discs in rows in the bed of sand sized lead zirconate, covering the ceramic discs with the sand sized lead zirconate, placing an alumina muffle cover over the sagger, and firing the covered sagger at 2260° F. for ¾ hour in a globar fired furnace.

References Cited by the Examiner
UNITED STATES PATENTS

| | | | |
|---|---|---|---|
| 1,802,776 | 4/1931 | Pence. | |
| 2,911,370 | 11/1950 | Kulcsar | 252—62.9 |
| 2,708,244 | 5/1955 | Jaffe | 252—62.9 |
| 3,006,857 | 10/1961 | Kulcsar | 252—62.9 |
| 3,021,441 | 2/1962 | Howatt | 252—62.9 |
| 3,035,325 | 5/1962 | Nicholson | 264—29 |

OTHER REFERENCES

S. Roberts: Journal of American Ceramic Society, vol. 33, No. 2, 63 (1950), all pages relied on.

Research Paper Number 2626, Journal of Research of the U.S. Bureau of Standards, vol. 55 No. 5, November 1955, Jaffe, Roth, and Marzullo, page 240 relied on.

ROBERT F. WHITE, *Primary Examiner*.

ALEXANDER H. BRODMERKEL, *Examiner*.

R. B. MOFFITT, *Assistant Examiner*.